June 27, 1939.  K. F. RODGERS  2,164,165
ELECTRICAL CONDENSER
Filed March 30, 1938  3 Sheets-Sheet 1

INVENTOR
K. F. RODGERS
BY
J. MacDonald
ATTORNEY

June 27, 1939.                K. F. RODGERS                2,164,165
                           ELECTRICAL CONDENSER
                           Filed March 30, 1938          3 Sheets-Sheet 2
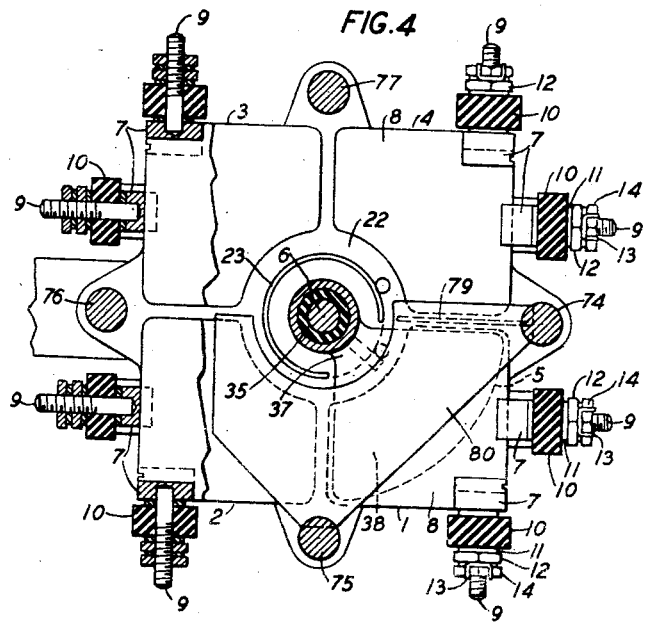
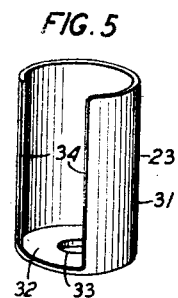
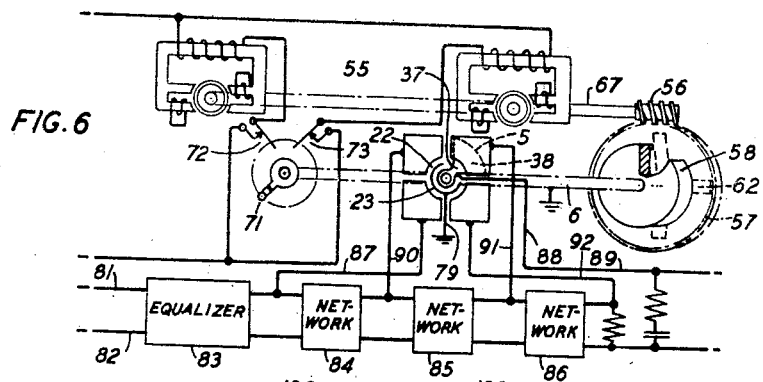
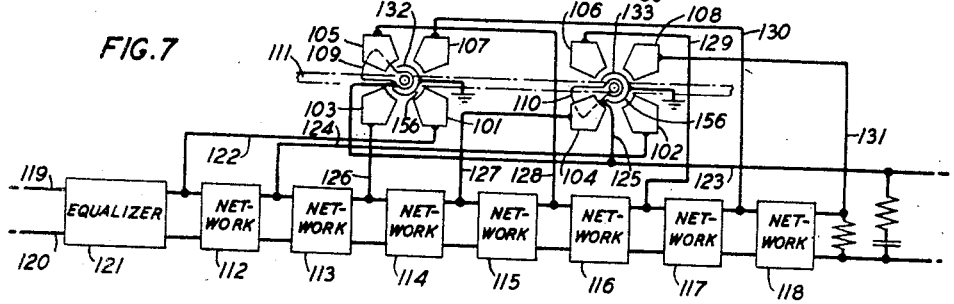
INVENTOR
K. F. RODGERS
BY J. MacDonald
ATTORNEY INVENTOR
K. F. RODGERS
BY J. MacDonald
ATTORNEY Patented June 27, 1939

2,164,165

UNITED STATES PATENT OFFICE 2,164,165

ELECTRICAL CONDENSER

Karl F. Rodgers, New York, N. Y., assignor to Bell Telephone Laboratories, Incorporated, New York, N. Y., a corporation of New York Application March 30, 1938, Serial No. 198,821

5 Claims. (Cl. 175—41.5)

This invention relates to variable electrical condensers and more particularly to a variable condenser having a set of rotor plates common to a plurality of sets of stator plates, the set of rotor plates being moved selectively into association with the sets of stator plates.

The object of the invention is to provide a condenser suitable for use as a variable capacitance selective switching device.

A feature of the invention resides in an electrical shield carried by the rotor and which operates to shield the required active portions of the device from the parasitic effects of the inactive portions.

Another feature resides in electrical shielding between certain of the sets of stator plates.

In the drawings:

Fig. 4 is a view partly in section of the structure taken in the direction of the arrows on the line 4—4 in Fig. 1;

Fig. 5 is a view in perspective of the shield which is carried by the rotor shaft;

Fig. 6 is a schematic view of apparatus including the condenser and driving means therefor and a portion of a system in which the condenser device of the invention may be used;

Fig. 7 is a view somewhat similar to Fig. 6 and showing a portion of a larger system and a condenser device modified to serve the system shown;

In electrical communication systems and particularly in carrier telephone systems changes occur in the transmission characteristics of the system. To maintain the transmission characteristics within certain predetermined limits it is the practice to provide equalizer networks and to bring the equalizer networks into association with the communication system to compensate for the changes in the transmisson characteristics occurring therein. Common and well-known switching devices of the type in which a movable contact is selectively moved into and out of engagement with fixed contacts are unsuitable for bringing the equalizer networks into association with the communication system. The making and breaking actions between the movable and fixed contacts introduces undesired signals in the communication system. The switching devices above mentioned are also found objectionable because considerable torque is required to drive the movable contact frictionally over the fixed contacts.

The condenser device of this invention may be employed to selectively bring the equalizer networks or portions thereof into association with the communication system since the device operates to gradually bring the network into association with the communication system and there is no physical or rubbing contact action in switching the required network into or out of the communication system. The condenser may be constructed and arranged to serve as a selective connection means between any desired number of equalizer networks and a communication system.

Figure 1:
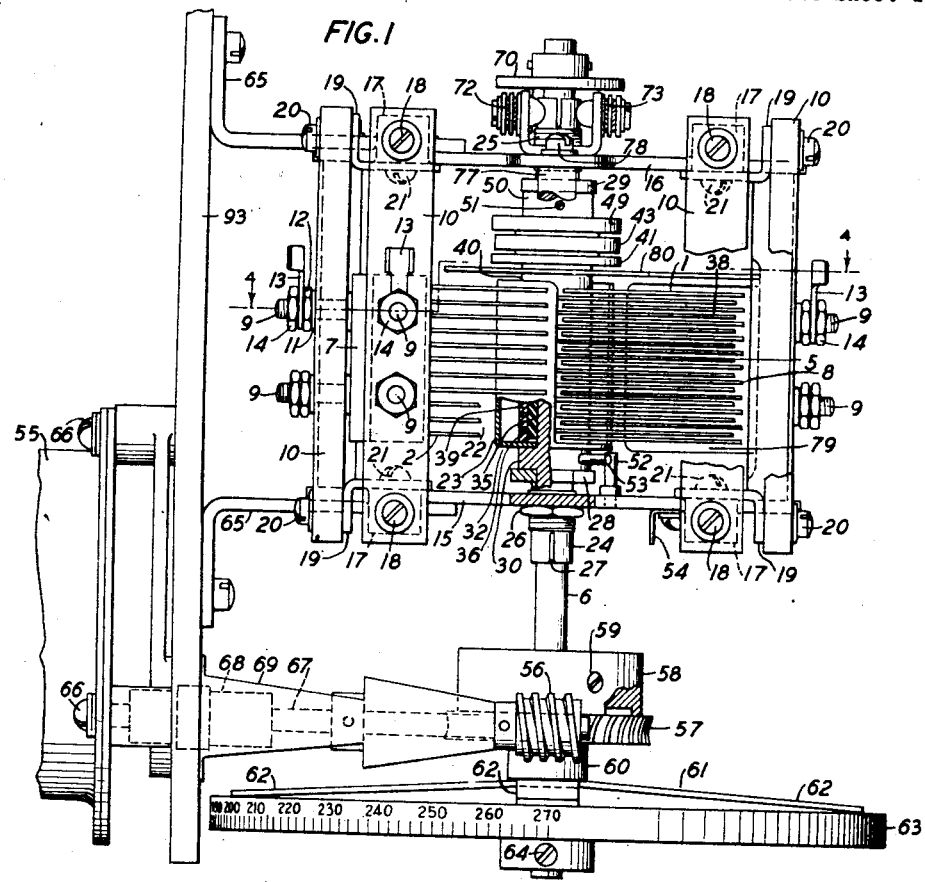
Fig. 1 is a top view of the condenser device together with parts of driving means for operating the condenser.
Figure 2:
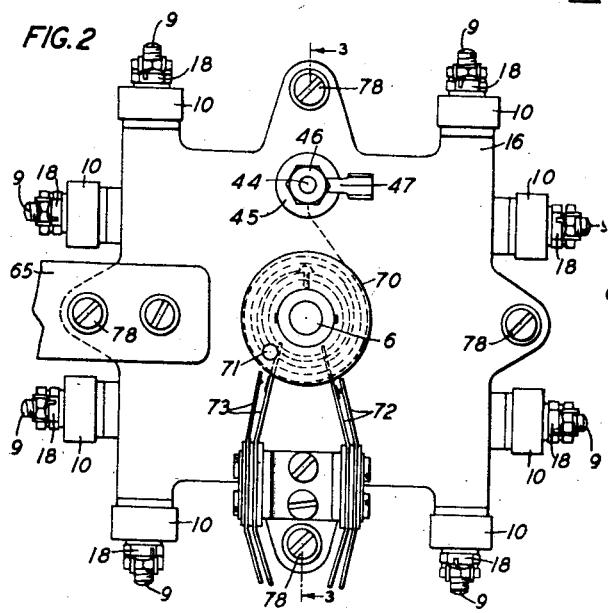
Fig. 2 is a rear elevational view of the device shown in Fig. 1.

The condenser as shown in the drawings and with particular reference to Figs. 1, 4 and 6 comprises four sets of stator plates 1, 2, 3 and 4 and a set 5 of rotor plates, the set of rotor plates being common to the sets of stator plates. The sets of stator plates are spaced from each other about a common central point and the plates in each stator set are disposed in equal planes with the corresponding plates in the other stator sets. The plates of the rotor set 5 are offset from the planes of the plates of the stator sets and are adapted to be interleaved with the plates of the stator sets. The rotor set 5, of plates is operated by means of a rotor shaft 6 and may be selectively brought into association with the required set of stator plates.

Each stator set comprises a plurality of metal plates held in spaced relation by means of metal tie bars 7. Since the stator sets are alike in structure, the description of one will suffice for all. The structure of the stator sets may be clearly seen by looking at stator set 1 wherein a plurality of rectangular metal plates 8 having one corner portion removed are supported in spaced relation by means of the tie bars 7—7, the tie bars 7—7 being slotted at spaced intervals to receive outer edge portions of the plates 8. Each tie bar 7 is equipped with laterally extending spaced studs 9—9. The studs 9—9 project through apertures in a rod 10 of insulating material. A washer 11 and a nut 12 are applied to the outer ends of the studs 9, the washer 11 being interposed between the inner face of the nut 12 and the outer face of the rod 10. The nut 12 serves to hold the studs 9 secured to the rod 10. A terminal 13 is held clamped on the stud 9 by means of a nut 14. The rods 10 extend between spaced end plates 15 and 16. End portions of certain of the rods 10 are secured to apertured lugs 17 on the end plates by means of screws 18. End portions of the other rods 10 are secured to apertured brackets 19 by means of the screws 20, the brackets 19 being secured to end plates of the frame by means of screws 21. The rods 10 are much longer than the tie bars 7 and serve to insulatingly support the stator set of plates between the end plates 15 and 16.

The spaced plates 8 of the stator sets 1, 2, 3 and 4 project inwardly of the tie bars 7 with the removed corner portions of the plates cooperating to form a circular space 22 to accommodate certain portions of the rotor assembly.

The rotor assembly comprises the rotor shaft 6, the set of rotor plates 5 and a rotor shield 23. The rotor shaft 6 is journalled in journal bearings 24 and 25 supported in the respective end plates 15 and 16. The journal bearings 24 and 25 are externally threaded and project through internally threaded apertures in the respective end plates 15 and 16. A lock nut 26 is provided on each journal bearing to hold the bearing against movement in the end plate. The bearings may be longitudinally slit for a portion of their length as shown at 27 to provide for adjustment about the shaft 6 and large head portions 28—29 are provided on the respective journal bearings 24 and 25, the head portions being disposed inwardly of the end plates. A flange 30 on the rotor shaft 6 frictionally bears against the inner face of the enlarged head portion 28 of the journal bearing 24.

The rotor shield 23 as shown in Fig. 5 is a metal cup-shaped member having an incomplete cylindrical side wall 31 and an end wall 32. The end wall 32 is apertured at 33 to receive the rotor shaft 6. The end of the rotor shield 23 opposite to that occupied by the end wall 32 is completely open. The side wall 31 is made in the form of an incomplete cylinder to provide an open space 34 to permit the extension therethrough of the rotor plates of the rotor set 5. The end wall 32 bears against the flange 30 of the rotor shaft 6 and is in sufficient contact therewith to provide electrical connection between the rotor shield 23 and the rotor shaft 6. The rotor shield 23 is of sufficient length to extend through the cylindrical space 22 cooperatively formed by the stator plates.

Figure 3:
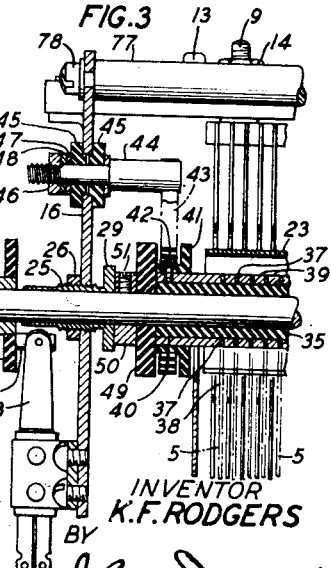
Fig. 3 is a side view partly in section of a portion of the structure taken on the line 3—3 in Fig. 2 and in the direction of the arrows.

Extending within the rotor shield 23 and enclosing a portion of the rotor shaft 6 is a tube 35 of insulating material. One end of the tube 35 is provided with a peripheral flange 36 which rests against the inner face of the end wall 32 of the rotor shield 23. The other end of the tube 35 projects beyond the open end of the rotor shield 23. Extending closely about the tube 35 of insulating material are apertured inner end portions 37 of rotor plates 38 of the rotor set 5. Also extending closely about the tube 35 of insulating material and alternated with the apertured inner end portions 37 of the rotor plates 38 are metal spacing washers 39, as shown in Figs. 1 and 3, the spacing washers 39 serving to hold the rotor plates in required spaced relation from each other and also serving as electrical connections between adjacent rotor plates. The apertured inner end portions 37 of the rotor plates 38 alternated with the spacing washers 39 are, therefore, built up in stack formation on the tube 35 of insulating material. A long spacing washer 40 extends about the end of the tube 35 of insulating material where the tube extends beyond the open end of the rotor shield 23. The long spacing washer 40 bears against the apertured inner end portion of one of the rotor plates 38. A flange 41 of insulating material having a hub portion fitting over the long washer 40 is secured against rotation on the long washer 40 by means of a set screw 42. The set screw 42 extends through the hub portion of the flange 41 and into a tapped hole in the long washer 40. A metal ribbon 43 is coiled about the hub portion of the flange 41 and the inner end of the metal ribbon 43 is clamped by means of the set screw 42 against the hub portion of the flange 41. The outer end of the coiled metal ribbon 43 is secured in a slotted end portion of a metal pin 44. The metal pin 44 is reduced in diameter at one end and extends through two apertured discs 45 of insulating material disposed in an apertured portion of the end plate 16 of the frame. The reduced end portion of the metal pin 44 is externally threaded to receive a nut 46. A terminal 47 and a washer 48 are provided between the nut 46 and one of the apertured discs 45 of insulating material. The metal ribbon 43 serves as a flexible electrical connection between the rotor assembly and the metal pin 44 and the terminal 47 provides a means whereby the wire of a circuit may be brought into electrical connection with the rotor assembly of the condenser. A washer 49 of insulating material is supported on the rotor shaft 6 and bears against one end of the long washer 40 and the hub portion of the flange 41. The washer 49 and the flange 41 extend on opposite sides of the coiled portion of the metal ribbon 43 and prevent undue displacement of the coils of the coiled portion of the metal ribbon. A metal ring 50 secured by means of a set screw 51 on the rotor shaft 6 and disposed between the head portion 29 of the journal bearing 25 and the washer 49 serves to hold the washer 49 against the long washer 40 and the hub portion of the flange 41.

By referring to Figs. 1 and 3 it will be seen that when the ring 50 is secured on the rotor shaft 6 by means of the set screw 51, the stack of rotor plates and washers, the tube 35 of insulating material and the rotor shield 23 are held against displacement along the rotor shaft 6 and that the apertured end portion of the rotor shield is pressed against the flange 30 on the rotor shaft 6. The journal bearing 25 may be adjusted in the end plate 16 so that there is not sufficient friction between the head portion 29 and the ring 50 to prevent rotation of the rotor assembly. The journal bearing 24 may be adjusted in the end plate 15 so that its head portion 28 frictionally bears against the flange 30 of the rotor shaft 6. By proper adjustment of the journal bearings 24 and 25 in the respective end plates 15, 16, the rotor may be adjusted so that the plates of the rotor set are brought into a position to interleave with the plates in the stator sets when the rotor assembly is rotated. A pin 52 extending inwardly from the end plate 15 and a pin 53 extending radially from the flange 30 of the rotor shaft 6 are provided as stop means to limit the extent of rotation of the rotor assembly.

As shown in Fig. 4, the rotor plates 38 are insulated from the rotor shaft 6 by means of the sleeve 35 of insulating material. The plates 38 extend through the opening 34 in the incomplete cylindrical side wall 31 of the rotor shield 23 and are shown as being in interleaved position relative to the set 1 of stator plates. In this position the active portions of the condenser are the set 5 of rotor plates and the set 1 of stator plates, the other sets of stator plates, namely sets 2, 3 and 4 being not closely associated with the rotor set. It will be noticed that in this position the rotor shield 23 lies between the apertured inner portions 37 of the rotor plates and the inactive or unselected sets of stator plates 2, 3 and 4. The rotor shield 23, as shown in Fig. 1, is in electrical connection with the rotor shaft 6 since the apertured end portion 32 of the rotor shield is in engagement with the flange 30 of the rotor shaft 6. The rotor shaft 6 is in frictional engagement with the journal bearing 24 which is mounted in the metal end plate 15. A terminal 54 is mounted on the end plate 15 to serve as a means for electrically connecting the rotor shield 23 through the rotor shaft 6, the journal bearing 24 and the end plate 15 to ground. The parasitic capacitances existing between the inactive stators and the rotor will be led to ground through the rotor shield 23 and the terminal 54. The active portions of the condenser which in this case are the rotor plates 38 and the stator set 1 will, therefore, be shielded from the parasitic effects of the inactive stator sets 2, 3 and 4.

The condenser may be operated by means of a motor 55 which is automatically brought into operation when there is a change in the transmission characteristic of an electrical communication system. The motor 55 drives a worm gear 56 engaging a worm wheel 57. The worm wheel 57 is rotatably supported on the rotor shaft 6 of the condenser and has one face portion in frictional engagement with the ring 58 secured on the rotor shaft 6 by means of a set screw 59. The worm wheel 57 has an integral hub portion 60 in frictional engagement with the spring 61. The spring 61 has arm portions 62 extending from an apertured central portion loosely supported on the rotor shaft 6 and in frictional engagement with the hub portion 60 of the worm wheel 57. The outer ends of the arm portions 62 frictionally engage the disc 63 mounted on the rotor shaft 6 of the condenser and secured thereto by means of a set screw 64. When the motor 55 is operated the rotor assembly in the condenser is rotated, but when the stop pins 52 and 53 are brought into engagement, the rotor assembly is stopped. The motor 55, however, may continue to operate or coast without causing further movement of the rotor assembly since there are only frictional connections between the gears driven by the motor and the rotor assembly in the condenser. The disc 63 may bear calibrated indicia as shown in Fig. 1 to indicate the extent of rotation of the rotor assembly. Since a friction clutch arrangement has been provided between the motor 55 and the condenser arrangement and the disc 63 is secured to the shaft 6, the rotor of the condenser may be manually rotated without moving the gears 56 and 57 and the rotor of the motor. The motor 55 and the condenser are shown as being mounted on a panel 93, but may be mounted on any other supporting structure found convenient for the purpose. As shown in Fig. 1, the condenser is mounted on the panel 93 by means of brackets 65. The motor 55 is mounted on the same panel by means of screws 66 and the shaft 67 of the motor 55 extends through bearing 68 supported in an arm 69 extending from and supported on the panel 93. The motor 55 may be a reversible type motor adapted to rotate the rotor assembly of the condenser in clockwise and counter-clockwise directions, or two motors may be employed for this purpose.

Since the particular type of motor employed for this purpose and the manner of its control does not form part of this invention, the motor and its control arrangement are not herein disclosed in detail. However, in order to obtain an understanding of how the invention may be used and the manner of controlling the motor, it may be assumed that the condenser is used in a gain control system such as is shown and described in Patent 2,049,195 issued July 28, 1936 to R. W. Chesnut and that the condenser of the present invention takes the place of the condenser shown in the patent and that 55 in the present condenser is equivalent to the two motors shown in the patent above identified and is controlled in the same manner. To provide a control arrangement for the motor so that the motor will be deenergized when the condenser has reached a predetermined limit in operation, the rotor shaft 6 of the condenser is extended through the end plate 16 and carries the disc 70 of insulating material. A pin 71 is provided on the disc 70. Paired contact springs 72 and 73 are suitably supported on the end plate 16 in the position to be engaged by the pin 71, the contact springs 72 and 73 being included in a control circuit for the motor. When the rotor of the condenser is rotated to the extent permitted by the stop pins 52 and 53, the pin 71 engages one of the spring contacts in the pairs 72 and 73 and causes separation of the contact springs to open the motor circuit. The motor therefore, is deenergized and stops driving the rotor element of the condenser. Should the motor coast, however, when this occurs the frictional connection between the motor and the rotor shaft 6 of the condenser will permit rotation of the motor without rotation of the rotor shaft 6 of the condenser.

The end plates 15 and 16 of the condenser are held in spaced relation by means of spaced bars 74, 75, 76 and 77 which are secured to the end plates by means of screws 78. Secured edgewise in the bar 74 and extending between the sets 1 and 4 of the stator plates is a metal plate 79. The plate 79 extends inwardly to the circular space 22 defined by the cut-off inner edge portions of the stator plates and serves as an electrical shield between the first and fourth positions of the condenser, the bar 74 being in electrical connection with the end plate 15 and the end plate 15 being connected to ground through the terminal 54.

A shield plate 80 supported edgewise in the bars 74 and 75 and extending in parallel spaced relation with the stators 1 and 2 and slightly overlapping part of the stator 4 is provided near one end of the stator plate assembly to carry off to ground some of the stray capacities that might develop in the condenser between adjacent stator sets of plates.

The condenser above described may be used as shown in Fig. 6 to gradually and selectively bring into association with an electrical signal system electrical networks to compensate for changes in the transmission characteristic of the system. In this figure wires 81 and 82 represent paired conductors of such a system. An equalizer 83 is connected across the wires 81 and 82, the equalizer 83 being of any form and value required for normal operation of the system. Networks 84, 85 and 86 of predetermined values are also connected across the wires 81 and 82. The networks 84, 85 and 86, however, may be shunted out or selectively brought into operation by means of the present invention.

When the rotor set 5 of plates is interleaved with the stator set 1 the networks 84, 85 and 86 are all shunted out by the condenser. In this position the shunt path is through conductor 87, stator set 1, rotor plates 38, conductor 88 to conductor 89 which, for instance, may lead to a suitable gain control amplifier, not shown. When the rotor plates 38 are interleaved with the stator set 2 the network 84 is inclined in the circuit containing the wires 81 and 82 and networks 85 and 86 are shunted out by the condenser. In this position the shunt path is through conductor 90, stator set 2, rotor plates 38, conductor 88 to conductor 89. When the rotor plates are in position 3 the network 85 is included in the circuit of the wires 81 and 82 and the network 86 is shunted out, the shunt path being through conductor 91 to the stator set 3, rotor plates 38 and conductor 88 to conductor 89. When the rotor plates are interleaved with the stator set 4 the networks 84, 85 and 86 are all included in the circuit of the wires 81 and 82 since conductor 92 leading to the stator set 4 is not connected between any of the networks.

The shield 23 as above mentioned is carried by the rotor shaft 6 and rotates in the space 22 and is interposed at all times between the rotor plates and the stator sets not interleaved by the rotor plates. For instance, as shown in Fig. 6, the shield 23 is interposed between the rotor plates and the stator sets 1, 2 and 4. Since the shield 23 is grounded through the rotor shaft 6, the end plate 15 and the terminal 54, any stray capacitances between the unused stator sets and the rotor are led to ground, the unused stator sets in this case being the sets 1, 2 and 4. In the event that a change occurs in the transmission characteristics of the system in which the condenser is associated and the motor 55 as a result of this change is automatically brought into operation to move the rotor plates to another position, say, for instance, to the position where the rotor plates are interleaved with the stator plates in the set 2, any stray capacitances from the stator sets 1, 3 and 4 are led to ground by way of the shield 23.

The shield 79 is interposed between the stator set 1 and the stator set 4, as shown in Fig. 4, to lead off to ground any stray capacitances that might develop in a series path through the unused stator sets and around the outside of the shield 23 to the rotor set of plates. The shield plate 80 serves to lead off to ground any stray capacitances developing around the end of the rotor set where the sheld 23 is open.

Figure 8:
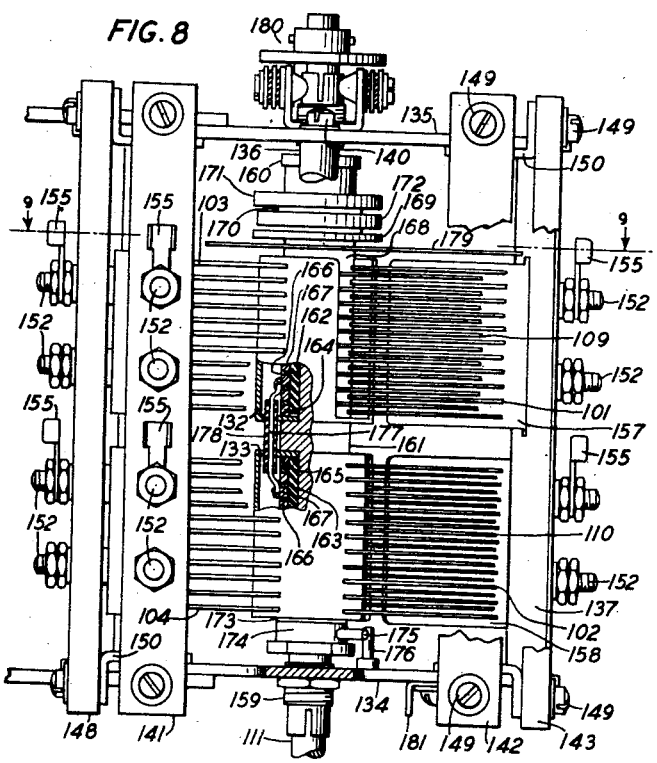
Fig. 8 is a top view partly in section of a modification of the condenser device suitable for use in the system shown in Fig. 7.
Figure 9:
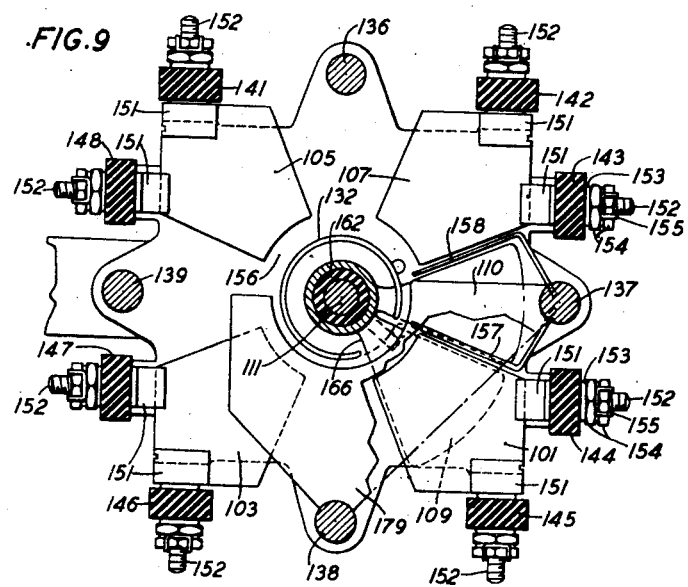
Fig. 9 is a view partly in section taken in the direction of the arrows on the line 9—9 in Fig. 8.

In Figs. 8 and 9 two condensers of the type shown in Figs. 1 to 6 are arranged in tandem in a common frame and are controlled by a common rotor shaft. This arrangement provides in effect an eight-stator condenser adapted to control the introduction of seven networks. The rotor portion of the condenser is divided into two parts, each part comprising a set of rotor plates, a shield, the shield taking the form of the shield 23 shown in Fig. 5, but having a narrower opening in the cylindrical wall. The stator plates and rotor plates of this condenser are also substantially eighth sections rather than fourth sections of a square. Fig. 7 shows in schematic form the condenser shown in Figs. 8 and 9 and the manner of its association with the seven networks.

In Fig. 7 the stator set 101 may be considered as the first position of the condenser, the stator set 102 the second position, the stator 103 the third position, 104 the fourth, 105 the fifth, 106 the sixth, 107 the seventh and 108 the eighth.

The plates of the stator sets 101 to 108, inclusive, are each substantially one-eighth sections of a square and are arranged equal distances apart around a common center. The inner end portions of the stator plates are cut away to provide a cylindrical space 156.

The rotor comprises two sets of plates, namely 109 and 110, each plate in the set being in the form of one-eighth of a square. The plates in the set 109 are in an advanced position relative to the plates of the set 110 so that when plates of the set 109 are fully introduced into a set of stator plates, the plates of the rotor set 110 will not be interleaved with a set of stator plates, but will be in a one-step position behind the plates of the set 109. The rotor sets 109 and 110 of the condenser shown in Figs. 7, 8 and 9 are supported in staggered tandem relation on a rotor shaft 111 which may be driven by means of a suitable motor or operated manually in the manner of the rotor shown in the condenser illustrated in Figs. 1 to 6. In normal position the plates of the rotor set 109 are interleaved with the plates of the stator set 101. The plates of the rotor set 110 when in normal position lie between the stator sets 108 and 102 and are not interleaved with any stator plates. The condenser as shown in Fig. 7 may be used as a means for selectively switching into and out of a transmission system seven networks 112 to 118. When the condenser is in normal position it serves to shunt out the networks from the lines 119 and 120 connected to which is an equalizer 121. The shunt path under normal conditions is through conducor 119, equalizer 121, conductor 122, the set of stator plates 101, rotor set of plates 109 and conductor 123. When the rotor shaft 111 is rotated to bring the rotor set of plates 109 out of interleaving relation with the set of stator plates 101 and the set of rotor plates 110 into interleaving relation with the set of stator plates 102, the network 112 is brought into the transmission circuit. The circuit under this condition is through conductor 119, equalizer 121, network 112, conductor 124, set of stator plates 102, set of rotor plates 110, conductor 125 to conductor 123. Network 113 to 118 under this condition are shunted out through the condenser. Network 113 is brought into the circuit when the condenser is operated to bring the rotor set of plates 109 into interleaving relation with the stator set of plates 103, the circuit being through conductor 119, equalizer 121, network 112, network 113, conductor 126, stator set of plates 103, rotor set 109 and conductor 123. In the next position of the condenser network 114 is brought into the circuit through conductor 127, stator set of plates 104, rotor set 110, conductor 125 and conductor 123. In the next position network 115 is brought into the circuit through conductor 128, stator set of plates 105, rotor set 109 and conductor 123. Movement of the rotor set of plates 110 into interleaving position with the stator set of plates 106 brings network 116 into the circuit through conductor 129, stator set of plates 106, rotor set 110, conductor 125 and conductor 123. In the next position network 117 is brought into the circuit through conductor 130, stator set of plates 107, rotor set 109 and conductor 123. The network 118 is brought into the circuit when the rotor set of plates 110 moves into interleaving relation with stator set 108, the circuit being from network 118 through conductor 131, stator set 108, rotor set 110, conductor 125 to conductor 123.

The condenser shown in Figs. 7, 8 and 9 contains the set of rotor plates 109 and the set of rotor plates 110 mounted on a common shaft 111. Each set of rotor plates is shielded by means of a shield member constructed along the lines of the shield shown in Fig. 5, but having a narrower opening in the cylindrical side wall. The shields are numbered 132 and 133 in the drawings for the purpose of identification. Shield 132 is associated with the rotor set of plates 109 and serves to shield the rotor set of plates 109 from parasitic effects of the stator sets of plates with which the rotor set 109 does not happen to be interleaved at the time. For instance, when the rotor set 109 is interleaved with stator set 105, shield 132 shields this portion of the condenser from parasitic effects of the stator sets 101, 103 and 107. Shield 133 serves in like manner for the rotor set 110. For instance, when rotor set 110 is interleaved with the stator set 104 the shield 133 shields this portion of the condenser from parasitic effects of the stator sets 102, 106 and 108. The condenser is also provided with other shields for further reducing or eliminating parasitic effects. These other shields are not shown in Fig. 7 but correspond to the shields 79 and 80 of the condenser shown in Figs. 1 and 4 and are further described in a more detailed description of the condenser which follows.

As shown in Figs. 8 and 9 the condenser shown in Fig. 7 comprises spaced metal end plates 134 and 135 held in spaced relation by means of the bars 136, 137, 138 and 139 and screws 140. Extending between the end plates 134 and 135 are spaced bars 141, 142, 143, 144, 145, 146, 147 and 148 of insulating material. The bars of insulating material are attached at their ends by means of screws 149 and brackets 150 to the end plates 134 and 135 and serve as supports for stator plate assemblies of the condenser. The stator plates are arranged in eight groups, four of the groups being disposed in one end of the condenser structure and the remaining four groups being located at the other end of the structure. The stator plates in each group are supported in spaced relation by means of metal tie bars 151 in which transverse slots are provided to receive edge portions of the stator plates. Each group of stator plates is supported by two tie bars 151. The tie bars 151 are equipped with spaced metal studs 152 which project through apertures in the bars of insulating material. Washers 153 and nuts 154 are provided on the studs 152 to hold the tie bars clamped to the bars of insulating material. Terminals 155 are supported on certain of the studs 152 to provide connection points for circuit wires of a system in which the condenser is employed.

The first four groups of stator plates 101, 103, 105 and 107 are arranged around a common center so that their inner edge portions cooperatively define a cylindrical space 156 and with each stator plate in a group lying in the same plane as corresponding plates in the other groups, that is to say, the first plate in the group 101 lies in the same plane as the first plate in each of the groups 103, 105 and 107. The plates in the stator groups 102, 104, 106 and 108 are arranged in the same manner as those in the groups 101, 103, 105 and 107, and so that group 102 is directly beneath group 101, group 104 beneath group 103, group 106 beneath group 105 and group 108 beneath group 107.

A metal shield plate 157 is located between group 107 and group 101 of stator plates to serve as an electrical shield between the first and fourth positions of the upper portion of the condenser. A metal shield plate 158 is also located between group 108 and group 102 of the stator plates in the lower portion of the condenser. The shield plates 157 and 158 are supported in rod 137 which extends between and is attached to the metal end plates 134 and 135 of the condenser frame. The rod 137 is longitudinally slotted in its upper half portion to receive an edge portion of the shield plate 157 and is longitudinally slotted in its lower half portion to receive an edge portion of the shield plate 158, the slot in the lower half portion of the rod 137 being angularly displaced slightly more than 90 degrees relative to the slot in the upper half portion. The shield plates 157 and 158 are so set in the rod 137 that the portions extending directly from the rod take diverging courses, each relative to the other, and for a distance slightly more than half of the extreme width of the rotor plates. The shield plates 157 and 158 then converge into the space 156 as shown in Fig. 9. The shield plates 157 and 158, as clearly shown in Fig. 8, are located at different levels relative to each other so that the shield plate 157, for instance, serves as an electrical shield for certain stator sets of plates in the upper portion of the condenser and the shield plate 158 serves in like manner for certain stator sets of plates in the lower portion of the condenser.

The rotor in the condenser shown in Figs. 7, 8 and 9 comprises the two sets of rotor plates, namely the upper set 109 and the lower set 110, the upper set 109 being adapted to be selectively interleaved with the stator sets of plates 101, 103, 105 and 107 and the lower set of rotor plates being adapted to be selectively interleaved with the stator sets of plates 102, 104, 106 and 108. The rotor sets of plates 109 and 110 are operated by means of the common rotor shaft 111 supported in bearings 159 and 160 in the respective end plates 134 and 135. The two cylindrical shields 132 and 133 of the type shown in Fig. 5, but having a narrower opening than is shown at 34, are mounted on the rotor shaft 111. The apertured end walls of the shields 132, 133 bear against a central flange 161 of the rotor shaft 111, the shield 132 extending upward from the upper face of the flange 161 and the shield 133 extending downward from the lower face of the flange 161 and the shields 132 and 133 being in electrical connection with the rotor shaft 111. Sleeves 162 and 163 of insulating material are supported on the rotor shaft 111 within the spaces defined by the respective cylindrical shields 132 and 133. The sleeves 162 and 163 are flanged at their respective inner end portions 164 and 165 to provide insulation between the shields 132 and 133 and stacks of rotor plates and spacing washers supported on the sleeves. The rotor plates in the sets 109 and 110 are apertured at their inner ends 166 to fit over the respective sleeves 162 and 163 and are stacked on the sleeves together with metal washers 167, the washers 167 being alternated with the rotor plates and serving as spacer members between the rotor plates and as electrical connection means between adjacent rotor plates. A long metal washer 168 corresponding to the metal washer 40, shown in Fig. 3, is provided as the uppermost metal washer in the stack of upper rotor plates in the set 109. A flange 169 of insulating material and having a boss portion 170 is supported on the long washer 168. A washer 171 of insulating material is supported on the shaft 111 and bears against the boss portion 170 of the flange 169, the flange 169 and the washer 171 serving as guards to maintain a spirally coiled conductor 172 in proper form. The coiled conductor 172 is electrically connected at its inner end to the long washer 168 of the upper rotor set and has its outer end electrically connected to a terminal, not shown, but corresponding to the terminal 44 in Fig. 3. A long washer 173 of insulating material is provided as the lowermost washer in the stack of rotor plates 110 to insulate the lower stack of rotor plates from a ring 174 carried by the shaft 111. The ring 174 is provided with a radially extending pin 175 which forms in cooperation with a pin 176 supported on the end plate 134 stop means to limit rotation of the rotor assembly. The two rotor sets are electrically connected by means of a conductor 177 which is electrically connected at each end to metal washers 166 in the rotor sets and which passes through apertures provided in the cylindrical metal shields 132 and 133. The conductor 177 is covered by a sleeve 178 of insulating material where it passes through the cylindrical shields 132 and 133.

A shield plate 179 corresponding to the shield plate 80 shown in Fig. 1 is provided in the upper condenser structure shown in Fig. 8. The shield 179 is supported by the bars 137 and 138 and extends over portions of the uppermost plates of stator sets 101 and 103. The shield plate 179 serves to reduce stray capacitances in the upper portion of the condenser.

The condenser shown in Figs. 8 and 9 may be operated by means of a suitable motor and clutch arrangement such as is shown in Fig. 1 which also provides means for manual operation. The contact and disc arrangement generally indicated at 180 in Fig. 8 corresponds to and performs the same function as the switch structure shown in Fig. 1 and comprising the contacts 72, 73 and the disc 70.

The cylindrical shields 132 and 133 of the condenser shown in Figs. 7, 8 and 9 are carried around by the rotor shaft 111 in the space 156 and as the rotors of the condenser are moved to new positions, the shields are progressively interposed between the apertured inner end portions of the rotor plates and the sets of stator plates not required in the new setting. Since shields 132 and 133 are electrically connected to the rotor shaft 111 and the rotor shaft 111 is grounded through the bearings 159 and 160, the end plates 134 and 135 and the terminal 181, stray capacitances from the stator sets which are not being used at the moment are led off to ground. Other stray capacitances not caught by the cylindrical shields are led off to ground by means of the shield plates 157, 158 and 179. The shield plates 157 and 158 are placed in a relatively staggered arrangement and positioned as indicated so that they will be between the adjacent first and last positions of the condenser. This permits substantially full rotation of the rotor assembly and at the same time catches stray capacitances that might build up through the stator plates not used at the time.

The condensers shown and described are built along the lines and are operated in the manner of variable condensers. They are so constructed and arranged, however, that the capacitances therethrough will remain substantially constant at all times. Their function is to control the introduction of suitable electrical networks or pads into a transmission system without having any making or breaking of contacts, or any frictional contact action in the switching operation and to perform the switching operations in a gradual manner, all of which tends to minimize the development of electrical impulses such as would produce undesired signals or noise in the transmission system. Since the switching operation is done by the gradual movement of a rotor element of a condenser from one set of stator plates to an adjacent set of stator plates, there is no physical contact action in the switching operation. Also, since the rotor plates as they are progressively moved to interleave with a set of stator plates, are moved in the same proportion from interleaving position with a like set of stator plates and of substantially equal form and dimensions to the new set, the capacitance in the condenser circuit is kept substantially equal at all times.

The condenser shown in Figs. 7, 8 and 9 while constructed along the lines of a gang condenser is, in effect, a single condenser with eight sets of stator plates arranged in two main groups and one set of rotor plates, the rotor being divided into two groups. As one group of rotor plates is gradually moved from a set of stator plates, the other rotor set in like manner is moved to interleave with the next set of stator plates.

What is claimed is:

1. An electrical condenser comprising groups of stator plates arranged in spaced relation around a common center and all of said groups being in the same plane, a rotor shaft disposed in the common center and spaced from said groups, a set of rotor plates insulatingly supported on said rotor shaft and movable selectively into association with a required group of said stator plates, and a cup-shaped electrical shield supported in said rotor shaft and movable therewith and extending in the space between said rotor shaft and the unselected groups of said stator plates and said shield having an opening formed in its side wall and said rotor plates extending through the opening.

2. An electrical condenser comprising a frame, end plates in the frame, four groups of stator plates insulatingly supported in said frame and extending inwardly thereof about a common center, the stator plates in each group extending in the same plane with corresponding plates in the other groups, a rotor shaft extending longitudinally of the common center and through said end plates, a set of rotor plates insulatingly supported on said shaft and adapted to be interleaved in group selection of said stator plates, and a cup shaped electrical shield secured at its base portion to said shaft and having an incomplete cylindrical side wall extending around portions of said rotor plates and between said rotor plates and the unselected groups of said stator plates to electrically shield said rotor plates from the unselected groups of said stator plates and said rotor plates extending radially of said shaft and through the cylindrical side wall of said shield.

3. In an electrical condenser, a rotor comprising a rotatable shaft, a sleeve of insulating material supported on said shaft, a set of rotor plates supported on said sleeve, and a cup-shaped shield plate having a side wall of incomplete cylinportions of said rotor plates and having an apertured base portion in engagement with said shaft.

4. In an electrical condenser two sets of stator plates each set comprising groups of plates arranged around a common center and one set being elevated relative to the other, an electrical shield plate extending transversely of the plates in a group of the first set of stator plates, an electrical shield plate extending transversely of the plates in a group of the second set of stator plates and elevated relative to the first shield plate, and a common support for said shield plates said shield plates extending first in diverging paths from said common support and then converging inwardly toward said common center.

5. An electrical condenser comprising a frame, end plates in said frame, a set of stator plates divided into groups, said groups being arranged around a common center and cooperatively defining a central space with the plates in each group extending in the same plane with corresponding plates in the other groups, a second set of stator plates located below the first set and constructed and arranged like those of the first set, a rotor shaft extending longitudinally of the common center and through said end plates, a set of rotor plates insulatingly supported on said shaft and adapted to be interleaved with a selected group of stator plates in the first set, a second set of rotor plates insulatingly supported on said shaft and angularly disposed relative to the first set of rotor plates, said second set of rotor plates being adapted to be interleaved with a selected group of stator plates in said second set of stator plates, curved electrical shields individual to said sets of rotor plates and carried by said shaft, said shields extending around portions of said rotor plates and between said rotor plates and the unselected groups of said stator plates, and an insulated electrical connection extending from one rotor set to the other and through portions of said shields.

KARL F. RODGERS.